H. H. LOCKE.

Pump-Rod Attachments.

No. 5,543. Reissued August 19, 1873.

Witnesses.

G. L. Davis

K. S. Redfield

Inventor.

Henry H. Locke, per R. F. Hoyard, atty.

UNITED STATES PATENT OFFICE.

HENRY H. LOCKE, OF PLEASANTVILLE, PENNSYLVANIA, ASSIGNOR TO DOUGLAS BLY, OF ROCHESTER, NEW YORK.

IMPROVEMENT IN PUMP-ROD ATTACHMENTS.

Specification forming part of Letters Patent No. 103,632, dated May 31, 1870; reissue No. 4,682, dated December 26, 1871; reissue No. 5,543, dated August 19, 1873; application filed August 9, 1873.

*To all whom it may concern:*

Be it known that I, HENRY H. LOCKE, of Pleasantville, in the county of Venango and State of Pennsylvania, have invented a certain Improvement in Pump-Rod Attachments, of which the following is a specification:

This invention consists of an attachment for a pump-rod, whereby the same may be adjusted in place and readily clamped in position, as hereinafter described.

Figure 3:
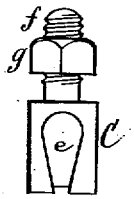
Figure 1:
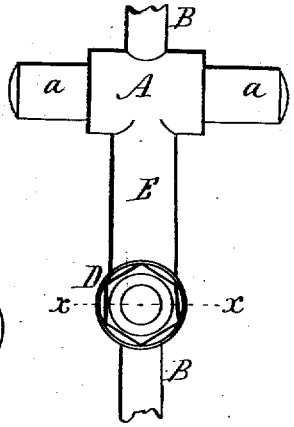
Figure 2:
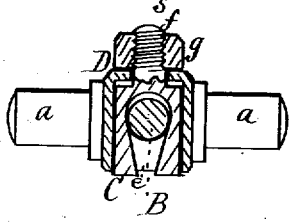

In the drawings, Figure 1 is an elevation of my improved attachment with a pump-rod connected therewith; Fig. 2, a horizontal section in line *x x;* Fig. 3, a plan of the clamping-bolt detached.

A represents the cross-head or bearing-block, which has an axis, *a*, that rests in the end of the working-beam and forms the joint to allow the necessary oscillation at different points of the stroke. D is the clamping-head, and E is the connecting portion between the cross-head and the clamping-head. A longitudinal aperture is formed through the cross-head A, connecting portion E, and clamping-head D, to receive the pump-rod B, which may be adjusted up and down therein, being held at different positions by the clamping-bolt hereinafter described. The clamping-head is also formed with a socket at right angles to the rod, having a shoulder or stop, and in this socket fits the clamping-bolt C. This bolt is formed with an opening or passage, *e*, of sufficient size to receive the rod B, and allow its ready adjustment up or down. The bolt is provided with a screw-shank, *f*, which extends through the clamping-head, and has a nut, *g*, screwed upon its end, by which it is tightened in place.

The bolt C being inserted in its place, as shown in Fig. 2, the pump-rod B is passed through its opening, when, by tightening up the clamping-bolt, the rod is clamped or griped and held firmly in place between the bolt and the clamping-head. This action is produced by the wedge action of the opening in the clamping-bolt and the contact against the clamping-head.

This arrangement is particularly adapted to deep-well pumps, which require a nice adjustment of the rod to adapt the piston to proper action with the valve.

What I claim, and desire to secure by Letters Patent, is—

1. A pump-rod attachment consisting of a cross-head, A, which forms the pivotal bearing, and a clamping-head, D, which forms the point of attachment for the pump-rod, when said parts are distinct from each other, and are connected by an intermediate part, E.

2. The clamping-bolt C, having a transverse opening or passage, *e*, in combination with a clamping-head, D, for the purpose of allowing the adjustment and producing the clamping of a pump-rod.

In witness whereof I have hereunto set my hand this 7th day of August, 1873.

H. H. LOCKE.

Witnesses:

A. HOLEMAN,

CHAS. MCCALL.